United States Patent

Krulik et al.

[11] Patent Number: 5,876,685
[45] Date of Patent: Mar. 2, 1999

[54] SEPARATION AND PURIFICATION OF FLUORIDE FROM INDUSTRIAL WASTES

[75] Inventors: Gerald A. Krulik, San Clemente; John A. Adams, Escondido; Dieter Dornisch, Oceanside; David W. Persichini, State College; Christopher S. Blatt, La Costa, all of Calif.

[73] Assignee: IPEC Clean, Inc., Oceanside, Calif.

[21] Appl. No.: 707,907

[22] Filed: Sep. 11, 1996

[51] Int. Cl.[6] ................................................. C01B 7/19
[52] U.S. Cl. .................. 423/488; 203/41; 210/662; 210/664; 210/683; 423/483
[58] Field of Search ............... 210/662, 663, 210/664, 668, 669, 670, 683, 915; 423/483, 484, 488; 203/29, 33, 36, 38, 41

[56] References Cited

U.S. PATENT DOCUMENTS

| | | | |
|---|---|---|---|
| 4,062,930 | 12/1977 | Zawadzki et al. | 423/483 |
| 4,067,957 | 1/1978 | Worthington et al. | 423/482 |
| 4,144,315 | 3/1979 | Worthington et al. | 423/490 |
| 4,655,929 | 4/1987 | Tanaka et al. | 210/664 |
| 4,764,276 | 8/1988 | Berry et al. | 210/264 |
| 4,898,317 | 2/1990 | Ito et al. | 228/41 |
| 4,952,386 | 8/1990 | Davison et al. | 423/484 |
| 4,965,061 | 10/1990 | Berry et al. | 423/484 |
| 5,294,305 | 3/1994 | Craft, Sr. et al. | 203/28 |

FOREIGN PATENT DOCUMENTS 1811178  8/1969  Germany.

*Primary Examiner*—Ivars Cintins
*Attorney, Agent, or Firm*—Knobbe, Martens, Olson & Bear, LLP

[57] ABSTRACT

A method for the removal and purification of substantially all of the fluoride ions contained in a solution containing greater than 10 parts per million (ppm) fluoride ion, a mixture of other anions, silicon in the form of a fluorosilicic acid, silicic acid, silicates, or silicon tetrafluoride, and optionally also containing complex metal fluorides, to produce an ultrapure hydrofluoric acid, comprising the steps of (a) adjusting the pH of the solution to an alkaline pH to hydrolyze the fluorosilicic acid and any complex metal fluorides; (b) removing the fluoride ions and other anions from the solution by passing the solution through an ion exchange resin, where the ion exchange resin is adapted to adsorb substantially all of the fluoride passed over the ion exchange resin; (c) displacing the fluoride ions and other anions bound to the ion exchange resin, thereby forming a mixture of anions in an effluent emanating from resin; (d) optionally concentrating the effluent at a high pH and then lowering the pH; and (e) distilling the mixture of anions in the effluent from a sulfuric acid solution to generate ultrapure hydrofluoric acid. An apparatus useful for practicing the method is also disclosed.

24 Claims, 2 Drawing Sheets

5,876,685

SEPARATION AND PURIFICATION OF FLUORIDE FROM INDUSTRIAL WASTES

BACKGROUND OF THE INVENTION

This invention generally relates to a process for the removal and purification of ions from solutions, and in particular, to a method and apparatus of removing fluoride ions from a waste process stream using an anion exchange resin, followed by distillation, to recover the fluoride ion as an ultrapure hydrofluoric acid.

Many industrial operations utilize fluoride, often as hydrofluoric acid or as fluoride salts such as ammonium fluoride. For example, semiconductor manufacturers utilize large amounts of hydrofluoric acid, and other fluoride compounds, to process silicon wafers. When using hydrofluoric acid (HF), semiconductor manufacturers often require an ultrapure hydrofluoric acid, defined as having all metals each below 1 part per billion (ppb), with all anions each below 10 ppb, including fluorosilicate anion, and total organic contaminants less than 100 ppb, preferably below 10 ppb.

The typical semiconductor manufacturer may produce an average of 10,000 gallons per day of a mixed acidic fluoride waste. The production of such vast quantities of fluoride ion waste, however, presents significant disposal problems. Fluoride wastes are becoming subject to increasingly stringent environmental controls for treatment and disposal. Most waste water effluent permits limit fluoride wastes to less than 10 ppm. Industry must therefore greatly reduce the fluoride content of waste solutions before the solutions may be introduced into the municipal water disposal system.

The ideal solution to the fluoride waste disposal problem would involve recycling of the fluoride from the waste and purifying it for reuse in the industrial process. Unfortunately, the current methods of removing fluoride from waste streams are not adapted to recycle fluoride wastes to produce the ultrapure HF required by industry.

The best current technology for removing the fluoride is the use of calcium salt caking system. Calcium sulfate, hydroxide, or chloride is reacted with the fluoride waste to form insoluble calcium fluoride which precipitates from solution. The remainder of the waste water constituents, including ammonia and nitrate, do not react and are sent to the drain. Drawbacks to this approach include the high amounts of residual fluoride that remain in the treated effluent and the large amounts of aqueous sludge that are created. In addition, it is very difficult for the semiconductor manufacturer to recycle the fluoride after this process has been used because caked calcium fluoride also contains high amounts of silicon as silica, which is difficult to separate from fluoride. The presence of silica in raw materials has adverse effects on many semiconductor manufacturing processes. Thus, all of the fluoride from conventional fluoride caking systems is unusable by semiconductor manufacturers being unavailable for recycle or recovery.

In addition to caking systems, anion exchange resins have been used to remove and concentrate fluoride ions from waste waters. Anion exchange resins will absorb all anions present in the waste water, including both $F^-$ (fluoride ion), and fluorosilicate ($SiF_6^{2-}$). Anion exchange resins can be stripped of absorbed fluoride ions by using either strongly basic solutions such as sodium or potassium hydroxide, or with strongly acidic solutions such as sulfuric acid. The anion exchange resin is typically used to exhaustion, then the fluoride and other anions which have also been absorbed from the waste water are removed by washing the ion exchange resin with strongly alkaline solution or with concentrated sulfuric acid. While this process works for removing fluoride from waste waters, silicon contamination is still a problem, because fluorosilicates also absorb on the strong base resin and are washed into the acidic or alkaline stripping solution.

Moreover, conventional ion exchange followed by distillation does not eliminate the problem of silicon contamination in recycled fluoride wastes. Fluorosilicates are difficult to separate from the desired HF by means of distillation. Fluorosilicic acid tends to codistill along with hydrofluoric acid, thus increasing the difficulty of distillation to ultrapure hydrofluoric acid containing extremely low amounts of contaminating metals and silicon. Furthermore, though most impurities can be removed by ultra high efficiency distillation, fluorosilicic acid (FSA) and its decomposition product silicon tetrafluoride are extremely difficult to separate.

The method chosen to strip the ion exchange column has little effect on the silicon contamination problem. When the resin is stripped with sulfuric acid, all of the absorbed fluorosilicic acid is released into the stripping solution. Some of the fluorosilicic acid will co-distill with water and hydrogen fluoride. The rest of the fluorosilicic acid may decompose to form hydrogen fluoride and volatile silicon tetrafluoride. The silicon tetrafluoride also co-distills and contaminates the final product, either directly as $SiF_4$ or by reacting with the distilled HF to give new fluorosilicic acid, $H_2SiF_6$. When the resin is stripped with strongly basic solution, several reactions occur. Fluorosilicate decomposes in alkaline solution to form silica and fluoride ions, as shown:

Because the stripping solution is strongly alkaline, the silica will react with the free alkali to form highly soluble silicates, $SiO_3^{2-}$. Thus, fluoride and silicon, in the form of silicates or silica, remain mixed together in the solution. Sulfuric acid is next added to allow distillation of HF. All of the above reactions are reversed upon acidification of the solution, and fluorosilicate is formed again. There is no net purification of the separated fluoride from the silicon contamination.

Previously disclosed methods for reducing silicon contamination are overly complicated or do not solve the current problem. German Patent 1,811,178 describes a process for neutralizing fluorosilicic acid with ammonia followed by filtration to remove silica. The ammonium fluoride is then precipitated using a metal salt, and anhydrous HF prepared using a high temperature decomposition process. U.S. Pat. Nos. 4,144,315 and 4,067,957 cover similar processes which use alkali metal precipitation of the fluoride followed by thermal decomposition.

U.S. Pat. No. 4,062,930 describes a method for destructive distillation of fluorosilicic acid from concentrated sulfuric acid, which releases gaseous silicon tetrafluoride byproduct. This does not solve the problem, however, because the silicon tetrafluoride is difficult to remove from the purified hydrofluoric acid. Much other patent literature in the manufacture of hydrofluoric acid from calcium fluoride exists which note the necessity of using low silica calcium fluoride as a raw material.

One process utilizing ion exchange resins for purification of process solutions of hydrofluoric acid is disclosed in U.S. Pat. No. 4,952,386. A weak base (weak anion) exchange resin is charged by conversion to the hydroxide form with a solution of an alkaline material such as ammonia or sodium hydroxide. The resin in rinsed to remove excess alkali. A solution of very high purity hydrofluoric acid is then passed through the weak base resin. Hydrofluoric acid in the form of unionized HF molecules is absorbed on the weakly basic amine ion exchange sites. This process continues until all of the sites are filled with HF. At this point the resin is ready for use, which is the removal of anionic contaminants from acidic hydrofluoric acid process solutions from the semiconductor industry.

A strong acid (strong cation) ion exchange resin is used to remove all positive ions from the waste stream and replace them with hydrogen ions. The hydrofluoric acid solution containing only anionic contaminants now passes through the treated weak base resin. Most anionic contaminants such as metal fluoride complexes are more tightly bound to the weak base resin than is HF. The waste stream has its contaminants removed and replaced with HF. The clean solution of HF is now ready for replenishment and reuse.

There are some drawbacks to this modified ion exchange purification procedure. This process works well to purify fluoride-containing process streams, but does not remove fluoride ion so cannot be used to concentrate or recover fluoride from waste water streams. Furthermore, there is no concentration of the purified HF solution. Consequently the purified solution is usually more dilute than the original process solution, so concentrated HF from another source must be added to regenerate the strength of the process solution. Another problem is that many of the metal fluorides are bound to the resin only slightly more efficiently than the HF. This limits both the total amount of HF which can be processed, and the purification which results. Furthermore, there is no removal of organic contaminants with this method. Finally, the process is less economical than is desired since the resin must first be charged with expensive pure HF; then the HF is lost when ammonia or caustic is used to regenerate the weak base resin. Economics are also unfavorable because of the strong acid resin which must be used prior to the weak base resin.

A further disadvantage to this process for recycling fluoride wastes results from the use of both strong acid and weak base ion exchange resins. Many fluoride containing solutions used in semiconductor manufacturing contain large amounts of ammonium fluoride, known as buffered oxide etchant (BOE). If a strong acid resin is used with BOE, all of the ammonium fluoride is converted to hydrofluoric acid. The strong acid resin must be regenerated very often at high cost. The ammonia in the BOE is lost during regeneration. Thus the above process is not useful with BOE process solutions.

Thus, there exists a need for a process and apparatus which can be used to treat all of the fluoride waste from a semiconductor manufacturing facility to separate substantially all the fluoride from the waste water, and recover it as an ultrapure concentrated hydrofluoric acid suitable for reuse.

SUMMARY OF THE INVENTION

The present invention is directed toward an efficient and economical method of recycling and purifying fluoride ion from fluoride containing wastes. Advantageously, the present invention is readily adaptable to semiconductor manufacturing waste streams, thereby permitting the semiconductor manufacturer to reduce costs, while also minimizing the amount of fluoride introduced into the environment.

In one aspect of the present invention, there is a method for the removal and purification of substantially all of the fluoride ions contained in a solution containing greater than 10 parts per million (ppm) fluoride ion, a mixture of other anions, silicon containing species in the form of fluorosilicic acid, silicic acid, silicates, or silicon tetrafluoride, and also containing complex metal fluorides, to produce an ultrapure hydrofluoric acid, by the steps of:

(a) adjusting the pH of the solution to an alkaline pH to release fluoride ion from the fluorosilicic acid and the complex metal fluorides;

(b) removing the fluoride ions and other anions from the solution by passing the solution through an ion exchange resin, where the ion exchange resin is adapted to adsorb substantially all of the fluoride passed over the ion exchange resin;

(c) displacing the fluoride ions and other anions bound to the ion exchange resin, thereby forming a mixture of anions in an effluent emanating from the resin;

(d) optionally concentrating the effluent in the form of a basic solution and then acidifying it; and (e) distilling the mixture of anions in the effluent from a sulfuric acid solution to generate the ultrapure hydrofluoric acid.

DETAILED DESCRIPTION OF THE INVENTION

Figure 1:
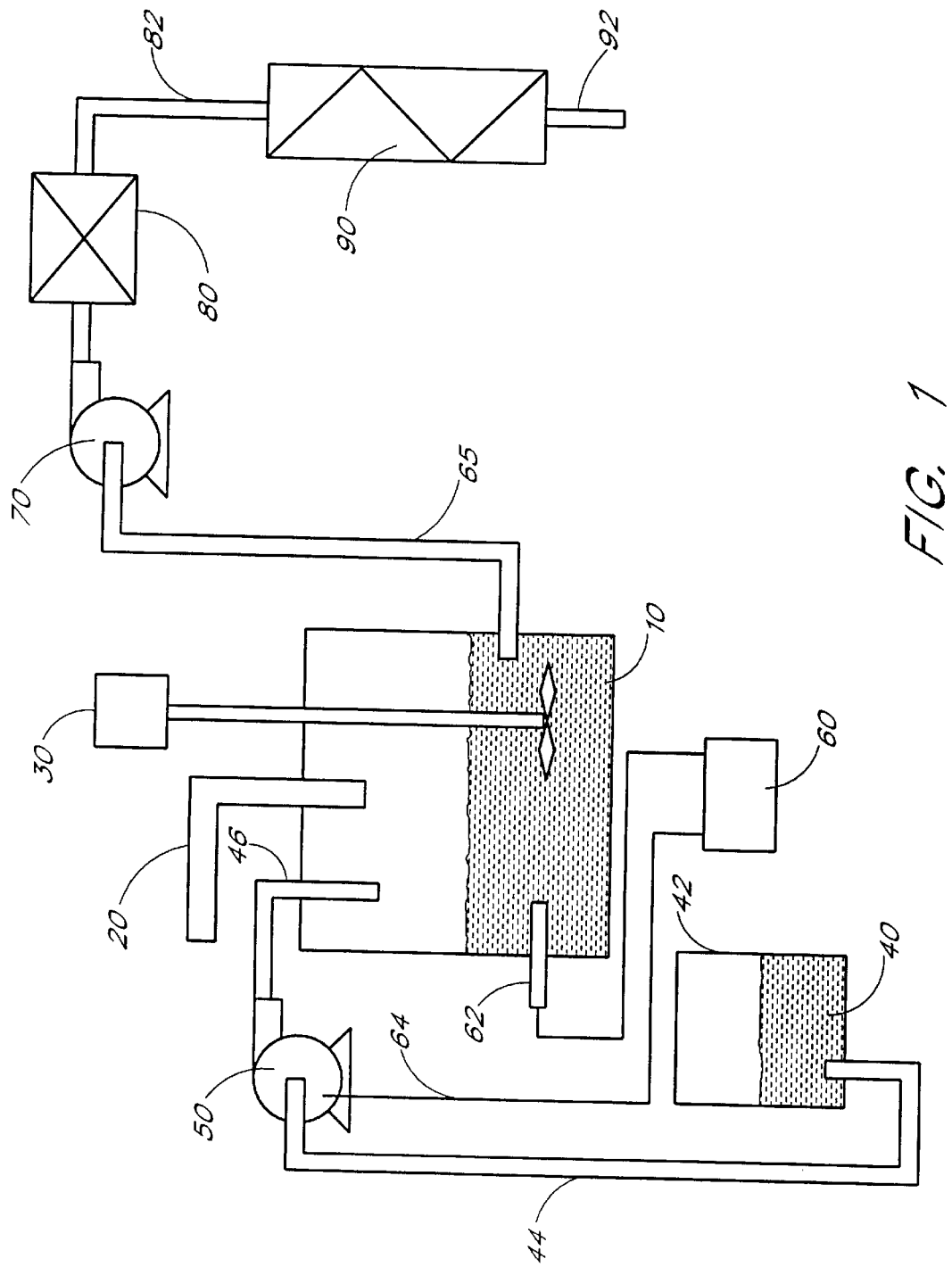
FIG. 1 is a schematic view of the pH adjustment and ion-exchange portions of an apparatus useful to practice the method of the present invention.

The present invention provides a method and apparatus for removal and purification of fluoride ions from a waste solution to produce ultrapure hydrofluoric acid.

The following outline of the process sets forth both required and optional steps for practicing the invention. A more detailed discussion, with examples, then follows.

PROCESS OUTLINE:

Step 1. Adjust the pH of the waste stream containing fluoride and silicon to pH 8–9. This hydrolyses fluorosilicic acid to silica ($SiO_2$), either dissolved, colloidal, or precipitated, depending on the concentration. If the solution is alkaline and silicates are also present, they likewise decompose.

Step 2. Contact the pH-adjusted solution with a Type 2 strong base ion exchange resin which has been converted to the hydroxide (—OH) form. The fluoride and other anions preferentially adsorb. Dissolved and colloidal silica absorb weakly and tend to pass through the column.

Step 3. After the strong base ion exchange resin is saturated with fluoride, it must be stripped to remove the fluoride. Two options are described: Option A, stripping with potassium hydroxide solution which is the preferred embodiment; and Option B, stripping with sulfuric acid. Many other options for regeneration and stripping are possible and obvious to those skilled in the art.

Option A. In one embodiment, a 5% by volume solution of potassium hydroxide is used to simultaneously strip the fluoride from the resin and to regenerate the resin to the hydroxide form.

Option B. A 10% by volume solution of sulfuric acid is used to strip the fluoride from the resin. After the fluoride is stripped, the resin is rinsed to remove the sulfuric acid. The resin is now regenerated to the hydroxide form by rinsing with 5% by volume sodium or potassium hydroxide.

Two alternatives are now available.

Step 4. Alternative A. In a preferred embodiment, the potassium hydroxide and potassium fluoride solution is neutralized and acidified with sulfuric acid. The alkaline solution may be pre-concentrated to any desired extent, even to complete dryness, prior to addition of the sulfuric acid. The amount of drying and the ratio of added sulfuric acid will help to control the concentration of the distilled HF. If little or no drying is performed, sulfuric acid addition will give lower HF concentrations, to a maximum of the azeotropic 35% (by weight) HF concentration. If the alkaline solution is concentrated to near dryness, addition of sulfuric acid will give concentrations of HF above the azeotropic concentration. In a preferred embodiment, the alkaline solution is taken substantially to dryness and greater than 95% by weight sulfuric acid is added to produce substantially anhydrous HF.

Step 4. Alternative B. The sulfuric acid solution containing hydrofluoric acid is distilled directly, with or without the addition of additional sulfuric acid. This yields less than or equal to the azeotropic 35% HF concentration.

Step 5. The sulfuric acid solution from Step 4, Alternative A or B, is distilled. The resulting solution of HF will be ultrapure but contain greater or lesser amounts of water, depending on the exact pretreatment as outlined in Step 4, Alternatives A and B. The distillation is to be carried out in a column with more than 10 theoretical plates to ensure separation of the ultrapure HF from trace amounts of impurities and volatile acids such as nitric, acetic, and hydrochloric acid.

The distillation column is designed for compatibility with concentrated HF and other acids, for the desired throughput of purified acid, and for the desired degree of separation and purification from its contaminants.

The output of ultrapure HF will have a concentration determined by the sum of the Steps 4 and 5. The HF concentration will generally be in the range of 30–100%, most preferably in the range of 49–100%.

DETAILED DISCUSSION:

The first step of the process comprises adjusting the pH of the waste solution to an alkaline pH. Advantageously, this pH adjustment will cause any fluorosilicic acid and complex metal fluorides to hydrolyze, thereby releasing the fluoride ion. The next step of the method is to remove the fluoride ions and other anions of the waste solution with a strong base ion exchange resin which will adsorb fluoride ions and other ions that come in contact with it. Next, the resin is washed with a strong nonvolatile acid or base to remove the anions, to form an aqueous mixture of anions. This mixture of anions, which includes the fluoride anion, may optionally then be concentrated. Finally, sulfuric acid is added to the concentrate and the resulting solution is distilled to generate an ultrapure hydrofluoric acid.

This process is useful with all fluoride waste streams commonly used in the semiconductor manufacturing industry. It provides an ultrapure hydrofluoric acid, improves the total recovery of fluoride from the waste streams, and reduces toxic fluoride waste residues from distillation. Moreover, fluoride removal by ion exchange allows compliance with all anticipated waste discharge regulations, as fluoride can be removed to well below 5 ppm.

Other volatile acids such as nitric acid and acetic acid, commonly used in semiconductor manufacturing processes, may also be present with the fluoride. Mixed acid solutions and solutions containing buffered oxide etchant are equally treatable. Depending on the distillation parameters and economic considerations, other volatile acids such as nitric acid and acetic acid may also be recovered by distillation.

In the pH adjustment step, the waste solution is preferably treated with ammonia to bring the pH to between pH 7 and pH 10, most preferably to between pH 8 and pH 9. This will cause fluorosilicates to decompose to silicon dioxide ($SiO_2$) colloids, and free fluoride ion. Careful pH control is important for optimum results, because if the pH is too low, incomplete fluorosilicate decomposition will occur. If the pH is above pH 10, silicon dioxide becomes rapidly converted to soluble silicates, $SiO_3^{2-}$, which can be adsorbed on the ion exchange resin.

There is an additional advantage to adjusting the pH prior to any further treatment. Semiconductor processing solutions contain low levels of many metal ions. Some, such as sodium, potassium, and lithium do not form complexes with dissolved fluoride and thus are not affected by the pH adjustment, nor do they absorb on an anion exchange resin column. Most other metals react with fluoride to form complex metal fluorides, including those of iron, aluminum, copper, titanium, nickel, zinc, and the platinum metals, which may be absorbed on anion ion exchange resins. These impurities can be substantially reduced or eliminated by pH adjustment to pH 7–10, then allowing sufficient time for base hydrolysis of the fluoride complexes. Filtration may be used to remove precipitates of the resulting metal oxides or hydroxides. The use of ammonia for pH adjustment gives an additional advantage since most of the metals which form fluoride complexes also form complexes with ammonium ions. Thus free ammonium ion from the pH adjustment step can produce a competing reaction to form soluble cationic metal complexes. These cationic complexes will not be adsorbed by a strong base ion exchange column. The use of both ammonium and hydroxide ions in combination is especially beneficial for treatment of semiconductor waste waters and waste process streams, since the composition of the mixture can vary widely and randomly. The general process for decomposition of the metal fluorides is illustrated for ferrous ($Fe^{2+}$) ion:

$FeF_4^{2-} + 2OH^- = Fe(OH)_2$ (insoluble) $+ 4F^-$ $FeF_4^{2-} + 2NH_4^+ = Fe(NH_4^+)_2^{4+}$ (soluble) $+ 4F^-$ The purified fluoride waste streams which are now largely free of dissolved metals and silicon can be distilled to ultrapure hydrofluoric acid suitable for semiconductor use.

A variety of strong or weak bases can be used to adjust the pH of the fluoride containing waste water. The most preferred alkaline material is ammonia or aqueous ammonium hydroxide due to its ease of control of the final pH, and its ability to form complexes or cause metal oxide/hydroxide precipitates. Other suitable materials include sodium hydroxide, potassium hydroxide, sodium carbonate, potassium carbonate, and strong organic bases such as choline base and tetramethylammonium hydroxide. If the waste solution is too alkaline, ammonium bicarbonate is preferred for pH adjustment. Sodium or potassium bicarbonate, carbon dioxide, or sulfuric acid may also be used.

After pH adjustment, the silicon dioxide may form precipitates if the initial fluorosilicic acid concentration is high. Preferably, these precipitates are filtered and removed before the solution is passed through the anion exchange resin, to prevent clogging. If the fluorosilicate ion is below about 100–200 ppm, no visible precipitation normally occurs, and the silicon dioxide will remain as a non-filterable colloidal suspension or as dissolved silicic acid. In that case, the colloidal particles readily pass though an ion exchange resin column so no silica is found in the stripping solution. Furthermore, dissolved silicic acid passes through a type 2 strong base anion exchange resin without adsorption, thus effecting its separation from the adsorbed fluoride.

After pH adjustment and, optionally, filtration, the solution is then passed through an anion exchange column. Any Type 2 strong base anion exchange column may be adapted to work in the process, such as AMBERLITE IRA 410 (Rohm & Haas Corp, Philadelphia, Pa.). Separately, the strong base anion exchange resin has been treated with a solution of potassium hydroxide solution to remove all anions and convert it into the effective hydroxide form, and is then rinsed until all free alkali is removed. The hydroxide stripping solution is preferably 2–20% by weight, more preferably 5–15% by weight, and most preferably 7–10% by weight. Fluorides, nitrates, and other anions (but not dissolved silica) are adsorbed by the conditioned resin. The hydroxide ions are released by the ion exchange resin in equimolar amounts. Because of the large amount of ammonium ions present from preexisting processes and from the initial pH adjustment, the released hydroxide ions combine with ammonium ions to form ammonium hydroxide. The point at which the ion exchange column is exhausted of its effective ion exchange capacity can easily be monitored by checking the effluent pH or electrical conductivity. When the pH returns to its incoming value, no more hydroxide is available for release. Likewise, the electrical conductivity of ammonium fluoride is greater than that of ammonium hydroxide, so an increase in electrical conductivity also signals exhaustion of the ion exchange column. In a preferred embodiment, the pH is monitored with a sharp decrease showing exhaustion of the ion exchange resin.

The exhausted, fluoride and other anion loaded ion exchange resin is then stripped to remove the fluoride ions and other anions. The ion exchange resin may be stripped with either strong acid or strong base. In a preferred embodiment, the resin is stripped with a 12–15% potassium hydroxide solution. Advantageously, stripping with a strong base such as potassium hydroxide also simultaneously regenerates the resin for further use. By using stringent controls on the volume of the stripping solution and by using countercurrent continuous extraction such as disclosed by Advanced Separation Technologies, Inc. in U.S. Pat. No. 4,898,317 and U.S. Pat. No. 4,764,276, full stripping may be effected by use of no more than one volume of stripping solution per volume of ion exchange resin. By using this method, as much as 10,000 gal. of waste water may be reduced to about 400 gal. of potassium hydroxide solution containing about 150 g/l of potassium fluoride and about 25 g/l of potassium nitrate, assuming typical semiconductor waste concentrations. This gives a concentration factor of approximately twenty-five times.

The resulting alkaline solution may then be easily concentrated to any desired extent, up to complete dryness, without loss of any volatile fluoride due to its alkaline nature. The concentration may be done by any standard technique, including forced air evaporative spraying at room temperature or with heating, distillation, or simple boiling. In one preferred process, forced air evaporative spraying is used. This distillation/concentration step also serves to remove substantially all low boiling point contaminants, such as residual ammonia and highly volatile organic materials. The resultant partially purified concentrate or solid is mixed with concentrated sulfuric acid and distilled in one or more distillation columns to give ultrapure hydrofluoric acid.

The exact size and operating conditions of the distillation columns are a function of the desired product purity and the throughput rate. One skilled in the art can design the appropriate distillation apparatus, using compatible materials of construction, such as Teflon, and appropriate design tools. The operation of the column is then carried out to design guidelines. The presently preferred distillation column holds 400 gallons and can evaporate the feed liquid to substantially dry condition in 12 hours. After drying, concentrated sulfuric acid is fed into the column. HF and Nitric acid are distilled overhead, collected and fed into a second distillation apparatus which can hold approximately 26 gallons. For this embodiment, the rate of production of the second distillation apparatus is approximately 3 gallons per hour of pure HF. This second distillation apparatus is sized appropriately and constructed of compatible materials, Teflon being the preferred choice.

Any desired concentration of hydrofluoric acid, from anhydrous, to a 49 wt % to 35.6 wt % azeotrope, to lower concentrations, may be obtained by appropriate adjustment of parameters such as the dryness of the concentrated salts and the concentration of the sulfuric acid. Nitric acid will also distill from this mixture, but will do so at a higher temperature than hydrofluoric acid so the mixtures are easily separated. In the preferred embodiment, the distillation residue after HF removal consists of a mixture of potassium sulfate, potassium bisulfate, sulfuric acid, nitric acid, and less than a few hundred ppm of residual fluoride. The HF is easily separated from the nitric acid, as anhydrous HF boils at 20° C. and anhydrous $HNO_3$ at 83° C. If an aqueous solution of salts is the starting material, or if more dilute sulfuric acid is used, the distillate will consist of aqueous mixtures of the acids. The aqueous mixtures are also easily separated, as the boiling point of the HF azeotrope is 111° C. and the nitric acid azeotrope is 120° C.

In a preferred embodiment of this invention, substantially anhydrous HF is distilled off the sulfuric acid and nitric acid residues to produce ultrapure HF. Ultrapure HF is defined as HF having all metals below 1 ppb, all anions each below 10 ppb, including fluorosilicate anion, and total organic contaminants below 100 ppb, preferably below 10 ppb.

The following examples are illustrative of certain embodiments of the present invention, and are not intended to be limiting:

EXAMPLE I

IONAC ASB-1® strong base ion exchange resin (available from Sybron Chemicals, Inc.) was used to remove fluoride ions from a simulated waste water. 520 grams of ion exchange resin was slurried in water and placed in a plastic separation column. The resin was in the chloride form. It was converted to the hydroxide form by treatment with three 500 ml portions of 5% (weight) sodium hydroxide. The resin was then rinsed with high purity deionized water until the effluent was approximately pH 6.

Simulated waste water was prepared by mixing 300 ml of 49% hydrofluoric acid with 500 ml of 30% ammonium hydroxide in one liter of water. The solution was then diluted to approximately 15 liters and excess hydrofluoric acid added to a final pH of about 5.5. Analysis with a fluoride specific electrode gave 13 grams of fluoride per liter.

The waste water was slowly passed over the resin, while monitoring the pH of the effluent water. The effluent was approximately pH 5 until the first volume of treated waste water began to exit the column. The pH abruptly changed to pH 11–12. (This effluent was separated and saved for use in Example II.) This showed that the hydrofluoric acid and the ammonium fluoride in the waste water was converted to water and ammonium hydroxide, while the fluoride was retained on the ion exchange resin. A sample was taken for fluoride analysis, showing less than 20 ppm of fluoride in the effluent.

The waste water flow was allowed to continue until the pH dropped to about 7–8, thus indicating the beginning of breakthrough. The effluent had about 4.75 g/l fluoride, showing that the resin had become saturated. The resin was then rinsed with water.

The fluoride laden resin was stripped with a solution of 5% (weight) sulfuric acid. As soon as the effluent pH decreased from approximately pH 6 to less than pH 3, large amounts of fluoride began to be detected. At pH<1, the sulfuric acid solution contained more than 30 g/l of fluoride. This solution was suitable for distillation to produce ultrapure hydrofluoric acid.

EXAMPLE II

The process of Example I was repeated using the same waste water but with a different ion exchange resin. Prior to passage through AMBERLITE IRA400 Type 2 strong base resin (Rohm & Haas Corp., Philadelphia, Pa.), a one liter sample of the waste water was adjusted to pH 8.5–9 using dilute ammonium hydroxide. The waste water was allowed to stand for one hour, then processed through the strong base resin as above. The resin extracted the fluoride from greater than 12 bed volumes of waste water while maintaining the fluoride in the effluent to an average of less than 5 ppm. The resin was then stripped with less than one bed volume of 12% potassium hydroxide solution. The fluoride content was >45 g/l, equivalent to >140 g/l as potassium fluoride. The stripping solution was acidified with sulfuric acid to give a solution suitable for distillation of ultrapure hydrofluoric acid.

EXAMPLE III

The process of Example II was repeated, using a waste water containing both fluoride and nitrate ions. The simulated waste water consisted of 2 g/l fluoride as hydrofluoric acid, and 0.6 g/l nitrate, as nitric acid. 100 ppm of fluorosilicic acid was added. The solution was adjusted to pH 8.5 with dilute ammonium hydroxide solution to decompose the fluorosilicic acid before processing. More than 12 bed volumes of ml of waste water was processed through the column while maintaining an average of less than 5 ppm of fluoride in the effluent. The resin was stripped with less than one bed volume of 12% potassium hydroxide solution, to give an alkaline solution containing greater than 40 g/l fluoride (equivalent to >140 g/l as potassium fluoride) and 8.6 g/l nitrate (equivalent to >14 g/l as potassium nitrate), with no detectable silicon.

EXAMPLE IV

Two test solutions of fluorosilicic acid were prepared, at 500 and at 5000 ppm concentrations. The exact composition is shown in Table I.

| TEST SOLUTIONS | MIXTURE A | MIXTURE B |
| --- | --- | --- |
| DI WATER | 1500 ml | 500 ml of Mixture A |
| 49% HF | 100 ml | — |
| 30% NH$_4$OH | 135 ml | — |
| 25% H$_2$SiF$_6$ | 2.8 ml | 7.3 ml |
| H$_2$SiF$_6$ CONTENT | 500 ppm | 5000 ppm |

The pH of a 50 ml sample of each was adjusted with 30% ammonium hydroxide to pH 8.5–9.0. They were stirred for 30 minutes, then filtered through an 0.2 micron fluorocarbon filter.

The 5000 ppm concentration solution rapidly formed a white gel-like precipitate which easily settled and was filtered from solution. Some samples additionally were treated with either anionic or cationic commercial organic flocculating agents. The 500 ppm concentration solution formed no visible precipitate. Both solutions were analyzed for residual, soluble or colloidal silica. Table II shows the results. The residual solubility of 200–250 ppm of SiO$_2$ in water of pH 8–9 is consistent with literature data on the solubility of dissolved or colloidal silica. The data show no effect due to fluoride mediated solubility, proving that the fluorosilicic acid is completely decomposed. Dissolved and colloidal forms of silica are retained poorly on many strong base ion exchange resins.

| TEST SOLUTIONS | MIXTURE A: ppm as SiO$_2$ | MIXTURE B: ppm as SiO$_2$ |
| --- | --- | --- |
| UNTREATED; pH 4.0 | 270 | 2328 |
| pH 8.5–8.6; no flocculent | 227 | not done |
| pH 8.6–9; cationic flocculent | 210 | 203 |
| pH 8.6–9; anionic flocculent | 233 | 259 |

EXAMPLE V

Figure 2:
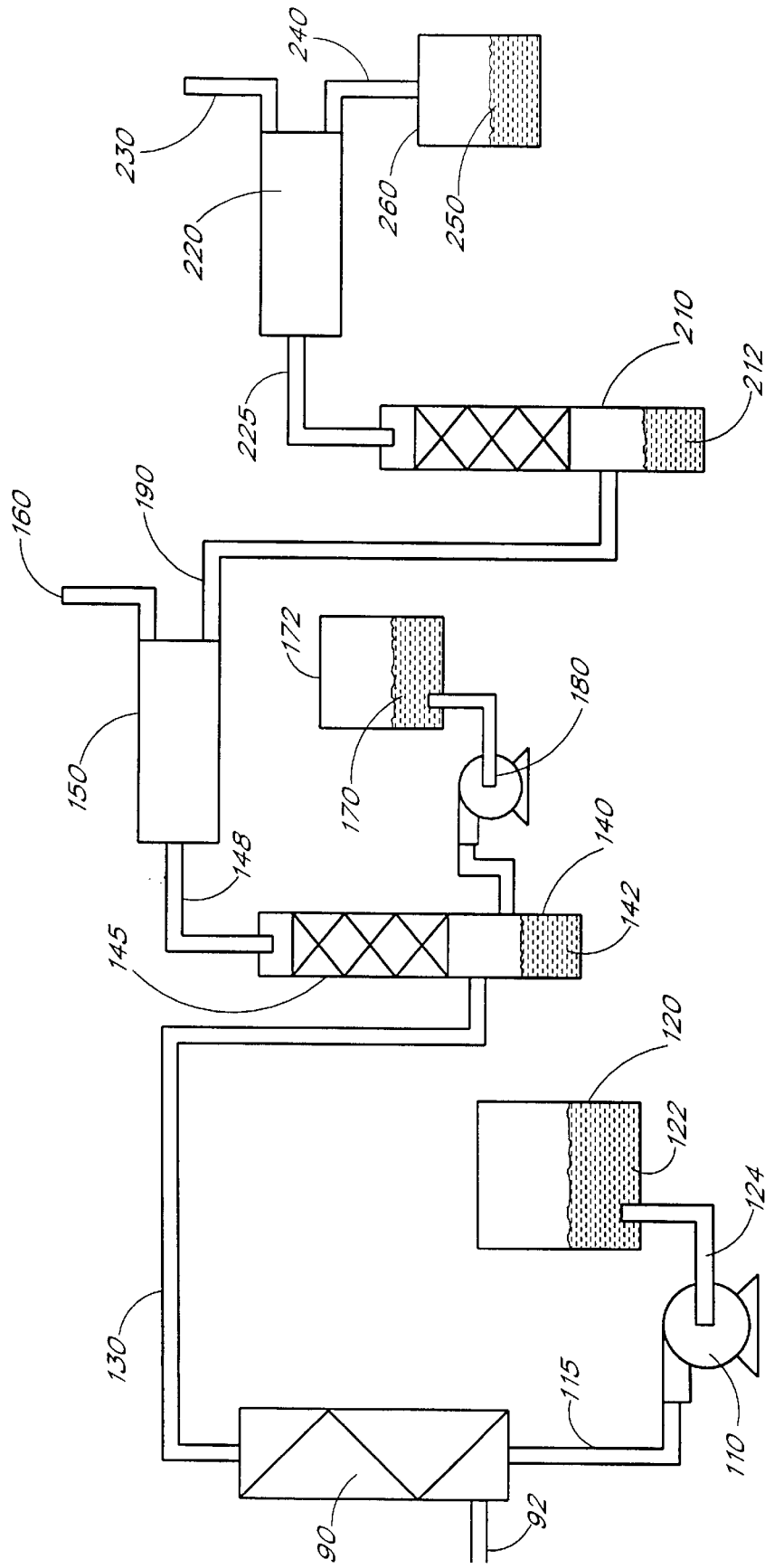
FIG. 2 is a schematic view of the ion-exchange and distillation portions of an apparatus useful to practice the method of the present invention.

Referring to FIGS. 1 and 2, there is illustrated in schematic form an apparatus useful for practicing the present invention. Fluoride containing waste water flowing from a semiconductor plant passes through a common drain to inlet 20 and is introduced into a 5,000-gallon holding tank 10 with a recirculating mixer 30. The pH is automatically adjusted to pH 8±0.5 using a solution of ammonium hydroxide 40 which is removed from tank 42 through line 44 by the action of metering pump 50. Pump 50 dispenses the appropriate amount of hydroxide solution into tank 10 through line 46. Pump 50 has a pH controlling feedback loop 60, which comprises a pH sensor 62 positioned within tank 10, and a control line 64 which sends a signal to pump 50 to activate pump 50 when sensor 62 detects a predetermined pH within tank 10. In one embodiment, the feedback loop is computer controlled.

Overflow from holding tank 10 is removed through outlet 65 by the action of pump 70. The overflow then passes through a filter 80, which is preferably a 10 micron filter, to remove large particles. The filtered liquid enters column inlet line 82, and is introduced into an ion-exchange column 90 containing a Type B strong base (anion) exchange resin, such as Rohm & Haas IRA 410. This resin removes the fluoride ion from the solution. The Type B resin of column 10 is pretreated with a 12–15% solution of potassium hydroxide solution 122 to remove all contaminating anions and convert the resin into the hydroxide form. The hydroxide form of the resin gives the most efficient fluoride removal. After this pretreatment, the Type B resin is rinsed until all free alkali is removed. The resin is then ready to remove the fluoride and nitrate anions.

After column 90 has been used to purify fluoride ion, the exhausted, fluoride and nitrate loaded ion exchange resin of column 90 is simultaneously stripped and the resin regenerated, with a 12–15% solution of potassium hydroxide 122, which is pumped from tank 120 through line 142 by pump 110. Countercurrent continuous extraction may also be used to get no more than one volume of ion exchange resin as stripping solution.

In this example, an initial 10,000 gallons of waste water may be reduced to about 400 gal. of potassium hydroxide solution containing about 150 g/l of potassium fluoride and about 25 g/l of potassium nitrate.

The alkaline solution is removed from column 90 through outlet line 130 and is introduced into a distillation column 145. In distillation column 145, the solution may be concentrated to nearly complete dryness by the evaporation of most of the water in distillation column 145. The distillation purifies the solution of low volatility contaminants, such as water, ammonia or organics. The low volatility materials removed in this manner may then be sent to exhaust 160 and eventually to a scrubber for environmentally-safe removal.

The resultant solid in column 145 is then mixed with a concentrated sulfuric acid solution 170. Sulfuric acid solution 170 is maintained within acid tank 172, and is dispensed to column 145 as needed by pump 180. After introduction of sulfuric acid solution 170 into column 145, a second distillation of the resulting solution is performed.

In this example, after distillation of the 400 gal. of solution, the dried solid consists of about 225 kg of potassium fluoride, 38 kg of potassium nitrate, and 20 kg of potassium hydroxide. An amount of acid in excess over the stoichiometric amount, namely 275 liters of 96% sulfuric acid is then preferably mixed with the 285 kg of dried solids.

The acid gas mixture from the second distillation is channeled through line 148 to condenser 150, then fed through line 190 into a second distillation column 210. By first being passed through distillation column 145, the acid gas mixture is separated from all of the high boiling point contaminants such as metals and particles. The metals which must be removed may include alkali metals such as sodium and potassium, alkaline earth metals such as calcium and magnesium, all transition metals, and all rare earth elements. In general, almost any metal ion is undesirable in ultrapure HF which is to be used for semiconductor manufacturing. Current allowable limits are in the range of one part per billion for any one metal and ten ppb for the total of all contained metals.

The next distillation step, through column 210, recycles and purifies HF from the distillate of column 145. Nitric acid and hydrofluoric acid form simultaneously in the initial mixture of sulfuric acid and dry solids, but the two acids boil at different temperatures. Nitric acid is a higher boiling point acid, so distillation column 210 can efficiently separate it from hydrofluoric acid. The two components are easily separated, as anhydrous HF boils at 20° C. and anhydrous $HNO_3$ at 83° C. The ultrapure hydrofluoric acid exits column 210 through line 225, and enters condenser 220, where it cools and condenses to form a liquid. The ultrapure hydrofluoric acid then passes through line 240 into pure acid tank 260, to form a reservoir 250 of ultrapure hydrofluoric acid for reuse. The higher boiling nitric acid is left in the column pot bottom 210.

In the example discussed previously, a total of about 77 kg of ultrapure HF as substantially anhydrous acid may be distilled from the mixture and collected in pure acid tank 260. Any noncondensible gases are fed into the waste gas scrubber system 230. About 23 kg of $HNO_3$ as anhydrous acid will remain in the pot bottom. The anhydrous ultrapure HF can easily be reconstituted to any desired strength of aqueous acid, or reacted with ammonia and water or ammonium hydroxide to give buffered oxide etchants.

Although the present invention has been described in the context of certain preferred embodiments, it is intended that the scope of the present invention be interpreted with reference to the full scope of the claims that follow, together with all lawful equivalents.

What is claimed is:

1. A method for the removal and purification of substantially all of the fluoride ions contained in a solution containing greater than 10 parts per million fluoride ion, a mixture of other anions, silicon in the form of a fluorosilicic acid, silicic acid, silicates, or silicon tetrafluoride, and optionally also containing complex metal fluorides, to produce an ultrapure hydrofluoric acid, comprising the steps of:
   (a) adjusting the pH of the solution to between about PH 7 and pH 10 to hydrolyze the fluorosilicic acid and any complex metal fluorides;
   (b) removing the fluoride ions and other anions from the solution by passing the solution through a Type 2 strong base ion exchange resin in hydroxide form;
   (c) displacing the fluoride ions and other anions bound to the ion exchange resin, thereby forming a mixture of anions in an effluent emanating from the resin; and
   (d) distilling the mixture of anions in the effluent from a solution comprising sulfuric acid to generate the ultrapure hydrofluoric acid.

2. The method of claim 1, further comprising the step of filtering the solution after the pH adjustment step (a) to remove particulate matter from the solution.

3. The method of claim 1, wherein step (a) comprises adjusting the pH of the solution to between pH 8 and pH 9.

4. The method of claim 1, wherein step (a) comprises treating the solution with ammonium hydroxide.

5. The method of claim 1, wherein step (a) comprises introducing ammonia gas into the solution.

6. The method of claim 1, wherein step (a) comprises treating the solution with a metal alkaline salt.

7. The method of claim 1, wherein step (a) comprises treating the solution with an organic amine.

8. The method of claim 1, wherein step (a) comprises treating the solution with an alkaline earth metal salt.

9. The method of claim 1, wherein step (a) comprises treating the solution with an alkaline metal bicarbonate.

10. The method of claim 1, wherein step (a) comprises treating the solution with ammonium bicarbonate.

11. The method of claim 1, wherein step (c) is performed by passing a strong base through the resin.

12. The method of claim 11, further comprising the step between steps (c) and (d) of concentrating the mixture of anions in the effluent by removing water from the effluent.

13. The method of claim 12, wherein the concentrating step is performed by forced air evaporative spraying.

14. The method of claim 12, wherein the concentrating step is performed by distillation.

15. The method of claim 12, further comprising the step of adding sulfuric acid to the concentrated mixture of anions before step (d).

16. The method of claim 11, further comprising adding an amount of sulfuric acid to the effluent emanating from the resin sufficient to form a neutral or acidic solution, thereby generating the solution comprising sulfuric acid in step (d).

17. The method of claim 11, wherein the strong base comprises potassium hydroxide.

18. The method of claim 1, wherein step (c) is performed by passing an acid through the resin.

19. The method of claim 1, further comprising the step of monitoring the solution passing through the resin in step (b) to determine when fluoride ionic breakthrough occurs.

20. The method of claim 19, wherein said monitoring step comprises monitoring the pH of the solution.

21. The method of claim 19, wherein said monitoring step comprises monitoring the conductivity of the solution.

22. The method of claim 1, wherein the resulting ultrapure hydrofluoric acid has total organic contaminants less than 100 ppb, no more than 1 ppb of any specific metal, and no more than 10 ppb of any specific anion.

23. The method of claim 22, wherein the resulting ultra-pure hydrofluoric acid has total organic contaminants less than 10 ppb.

24. The method of claim 22, wherein the resulting ultra-pure hydrofluoric acid contains no more than 10 ppb fluorosilicate anion.

* * * * *